No. 798,055. PATENTED AUG. 22, 1905.
J. H. NICHOLSON.
MANUFACTURE OF COMPOUND TUBING.
APPLICATION FILED APR. 25, 1904.

2 SHEETS—SHEET 1.

WITNESSES

INVENTOR
J. H. Nicholson

No. 798,055. PATENTED AUG. 22, 1905.
J. H. NICHOLSON.
MANUFACTURE OF COMPOUND TUBING.
APPLICATION FILED APR. 25, 1904.

2 SHEETS—SHEET 2.

WITNESSES

INVENTOR

UNITED STATES PATENT OFFICE.

JOHN H. NICHOLSON, OF PITTSBURG, PENNSYLVANIA, ASSIGNOR TO NATIONAL TUBE COMPANY, OF PITTSBURG, PENNSYLVANIA, A CORPORATION OF NEW JERSEY.

MANUFACTURE OF COMPOUND TUBING.

No. 798,055.         Specification of Letters Patent.         Patented Aug. 22, 1905.

Application filed April 25, 1904. Serial No. 204,704.

*To all whom it may concern:*

Be it known that I, JOHN H. NICHOLSON, of Pittsburg, Allegheny county, Pennsylvania, have invented a new and useful Improvement in the Manufacture of Compound Tubing, of which the following is a full, clear, and exact description, reference being had to the accompanying drawings, forming part of this specification, in which—

Figure 1:
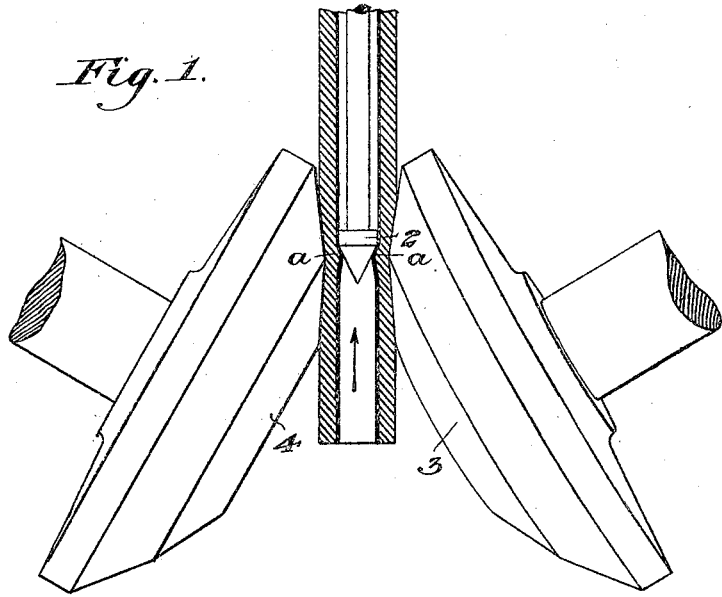
Figure 2:
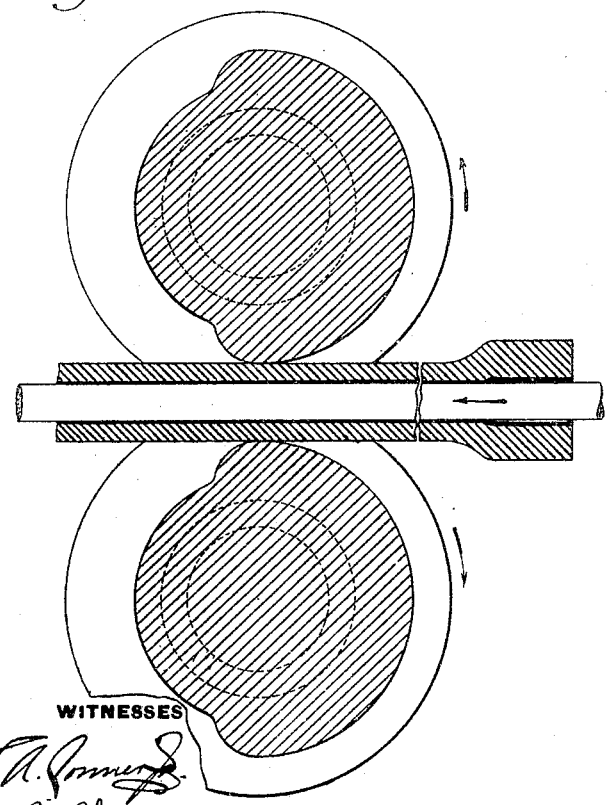
Figure 3:
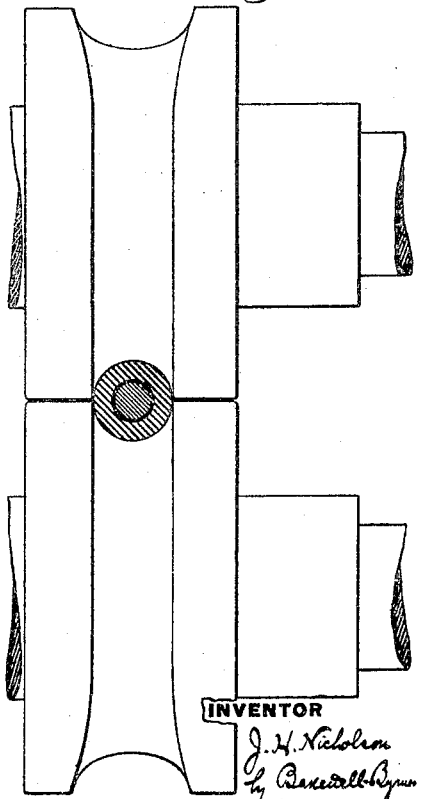
Figure 4:
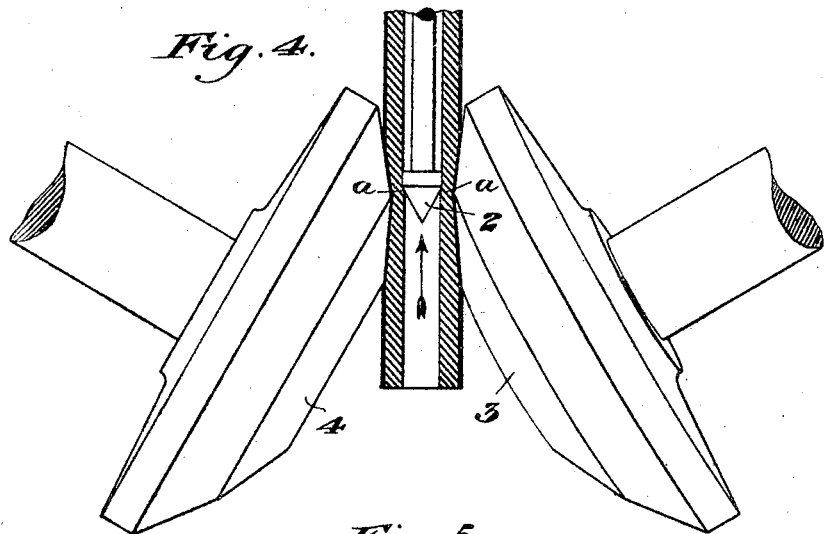
Figure 5:
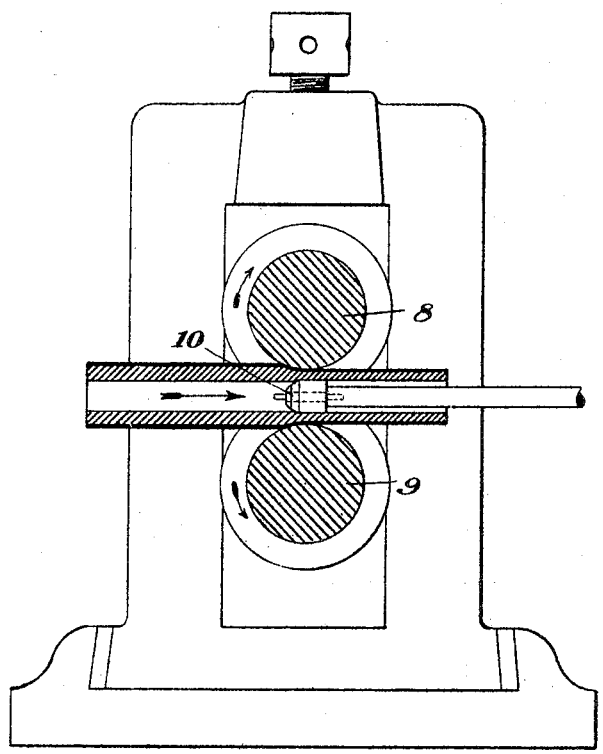

Figure 1 is a sectional plan view showing the step of welding a thin heated nickel tube to a heated pierced billet. Figs. 2 and 3 are views showing the reducing and elongating of the compound hollow billet. Fig. 4 is a plan view similar to Fig. 1, showing the welding of an exterior cover to the pierced billet; and Fig. 5 shows another means of welding the exterior covering.

My invention relates to the manufacture of compound tubing having an inside or outside covering.

The invention relates particularly to the welding of a nickel covering, either external or internal, or both, to a steel or iron tube in order to give a non-corrosive surface, and is designed to provide a process whereby the surfaces may be thoroughly welded, so that when the tube is bent, expanded, or otherwise changed in form there will be no separation between the layers.

Iron and steel tubes have been coated by dipping in zinc, tin, lead, &c., and have also been electroplated with copper, nickel, &c. This electroplating can be carried out successfully in giving an exterior coating; but it is very difficult to electroplate the interior of the tube. Where this coating is of considerable thickness, the electroplating of metal is irregular, porous, and brittle, and the metals are liable to separate when the tube is beaded or manipulated. It has also been proposed to weld a copper or brass lining in iron or steel tubes; but the melting-points of the two metals are so dissimilar that when this is attempted the copper or brass lining or covering will melt and run before the iron or steel reaches the welding temperature. Hence there is no substantial weld between the metals in this case, and when the tube is changed in form the metals will separate.

I have discovered that I can successfully weld a layer of nickel to an iron or steel tube either externally or internally by protecting the welding surfaces from oxidizing influences while heating the nested blank, and that by applying pressure a substantial and perfect weld is obtained. Nickel is well adapted to withstand corrosion and oxidation at ordinary temperatures. It is of about equal hardness with steel, and the fusing-points of the two metals are near each other.

In attempting to weld nickel to iron by ordinary methods the nickel when heated absorbs oxygen, which changes the nature of the welding surface and prevents a proper welding; but by nesting the two hollow blanks of nickel and iron within each other and protecting their welding surfaces while heating I can obtain excellent results.

In carrying out my invention for the manufacture of a nickel-lined boiler-tube I preferably take a pierced steel billet that has had its interior surface pickled or cleaned, so as to remove all scale or oxid, and nest within it a thin nickel tube of the same length as the pierced billet. I then drive tapering plugs into the ends of the nickel tube, expanding the same so that they fit snugly into the ends of the hollow billet and prevent the air and hot gases of the furnace from coming in contact with the welding surfaces of the nickel and steel to any harmful extent. I then place this compound hollow billet or blank in a furnace and heat it to, preferably, about 2,200° to 2,300° Fahrenheit. When the blank is thoroughly heated to this temperature, it is withdrawn from the furnace and passed through angularly-disposed rotating rolls or disks and over an interior supporting-mandrel, giving it a high rotary speed and at the same time a forward motion over the mandrel, subjecting all portions of the billet to a great pressure, reducing the thickness of wall, and elongating the billet. For this operation I preferably use the apparatus of United States Patent No. 718,723, dated January 20, 1903, as shown in Fig. 1, the compound blank being rotated and forced forwardly on the mandrel 2 by means of the disks 3 and 4. As the blank passes forward it is first compressed at the point *a* and is then expanded and elongated as it passes over the tapering mandrel-head. This operation is of peculiar advantage in welding, since it imparts a continuous spiral movement and great pressure, which are extremely effective in giving a weld. The welded blank thus formed is then placed on a mandrel 5 and at the same heat is reduced in diameter and thickness and elongated by the well-known swaging process used in making seamless steel tubes. This step of the process is illustrated in Fig. 2, in which the swaging-rolls are shown at 6 and 7. The hot rolled tube as it comes from the swaging-mill can be further reduced in diameter and thickness of wall, if so desired, by the usual method of cold-drawing, as well understood by those versed in the art. In this step the wall thickness of the nickel and the steel is reduced proportionately and the compound tube draws like one solid piece of metal, the weld being so perfect that the line of union of the two metals cannot be detected without etching with acid, the color of the nickel and steel being alike.

In Fig. 4 I show the welding of an exterior covering to the pierced billet. This operation of welding is identical with that of welding the interior lining, excepting that the thin nickel tube is on the outside instead of the inside of the steel blank.

In Fig. 5 I show another means of welding an outside covering onto a pierced blank by passing the composite hollow billet through circular grooved rolls 8 and 9 of the bar-mill type and over an interior supporting mandrel-plug 10, the composite billet having been prepared and heated similarly to the operation described for producing lined tubing, excepting that the thin nickel tube is placed on the outside of the pierced blank. After the first pass over the mandrel-plug this covered blank may be reduced in thickness and elongated by giving it additional passes over the mandrel-plug and through smaller grooves, reducing the diameter and thickness of wall to any desired size or thickness.

The advantages of my invention will be appreciated by those skilled in the art. A tube is formed which presents the advantages of a solid nickel tube, without its high cost. The method of securing the weld between the nickel and steel is peculiarly adapted to the usual method of manufacturing seamless tubes. No new apparatus of any kind is required, as the cross-rolling device used for securing the weld is the same as is used for the production of the pierced steel billets, and the subsequent rolling devices for elongating the welded blank are the same as used for making the seamless steel tubes. The nickel tubes for lining and covering are made in an identical manner as the steel tubes. The only difference in making the steel tubes and the nickel lining-tubes is the duplicating of several of the different operations. The article produced is of high quality, as the weld is substantially perfect throughout and the metals will not separate when the tube is beaded or otherwise changed in form. Although the nickel may be much less malleable than the steel, the compound tube can be subjected without injury to substantially the same treatment as a tube of steel.

The protecting of the welding surfaces of the hollow blanks is of great importance, as it enables me to obtain the complete weld between the blanks. The small amount of air between the blanks does not prevent their welding, and during the heating the inner finished nickel blank expands, thus bringing the welding surfaces closer together.

The invention may be used for the welding of steel or iron to an alloy of nickel, the same being nested and treated as before described. It may also be used for welding other dissimilar metals or alloys the surfaces of which cannot be welded by ordinary methods on account of the oxidizing or change in the nature of the welding surfaces due to contact with the hot gases of the furnace. Instead of expanding the ends of the thin tube the tubes may be nested together so closely as to practically exclude the oxidizing-gases. I may also take the pierced billet as it comes in its heated condition from the piercing-mill, before it has had time to materially oxidize on its inner surfaces, and slip the lining-tube within it and then pass the compound blank through a circular rolling-mill pass, which will roll the pierced steel blank down onto the lining-tube. This will prevent the oxidizing of the welded surfaces during the heating of the compound blank.

In appplying the external cover to the pierced blank I may heat the cover, slip it on the hot pierced blank before scale has formed on its exterior, and then pass the blank through a circular rolling-mill pass, thus bringing the surfaces closely together and preventing the oxidizing action, so that both surfaces are in excellent shape.

The apparatus employed may be changed, and many other changes may be made without departing from my invention.

I claim—

1. The method of making a compound tube comprising an iron or steel body and a nickel tube welded thereto, consisting in compressing and welding a hollow iron or steel blank and a tube of nickel alloy while said blank and tube are heated to a welding temperature, the adjacent surfaces of said blank and tube being protected from oxidation; substantially as described.

2. The method of making a compound tube comprising an iron or steel body and a seamless nickel tube welded thereto, consisting in compressing and welding a hollow iron or steel blank and a seamless tube of nickel alloy while said blank and tube are heated to a welding temperature, the adjacent surfaces of said blank and tube being protected from oxidation; substantially as described.

3. The method of making compound tubing, consisting in nesting together a heavy-walled hollow steel blank and a thin-walled tube of nickel or nickel alloy closing at the end the intermediate space between said tubes to exclude oxidizing-gases, heating the compound blank and compressing and welding it over an internal support and between rolls; substantially as described.

In testimony whereof I have hereunto set my hand.

JOHN H. NICHOLSON.

Witnesses:
   GEO. B. BLEMING,
   JOHN MILLER.